United States Patent [19]

Perkins

[11] Patent Number: 5,054,526

[45] Date of Patent: Oct. 8, 1991

[54] METHOD AND SYSTEM FOR REDUCING HYDROCARBON VAPOR EMISSIONS FROM TANKERS

[75] Inventor: Thomas K. Perkins, Dallas, Tex.

[73] Assignee: Atlantic Richfield Company, Los Angeles, Calif.

[21] Appl. No.: 497,278

[22] Filed: Mar. 22, 1990

[51] Int. Cl.⁵ .............................. B65B 1/04; F24H 3/00
[52] U.S. Cl. ..................................... 141/1; 114/74 R; 114/74 A; 237/12.3 C; 141/4; 141/11; 141/63; 141/82
[58] Field of Search .................. 141/1, 4, 5, 11, 63, 141/82; 165/41; 237/12.3 C, 43; 114/74 R, 74 A; 98/31

[56] References Cited

U.S. PATENT DOCUMENTS

| | | | |
|---|---|---|---|
| 1,410,287 | 3/1922 | Ebsen | 114/74 R |
| 2,465,779 | 3/1949 | Ahlbom | 114/74 R |
| 3,898,846 | 8/1975 | McCabe | 114/74 A |
| 4,844,336 | 7/1989 | Huber et al. | 237/12.3 C |

FOREIGN PATENT DOCUMENTS

| | | | |
|---|---|---|---|
| 173314 | 7/1987 | Japan | 237/12.3 C |
| 89027 | 2/1957 | Norway | 114/74 R |
| 1299900 | 3/1987 | U.S.S.R. | 114/74 R |
| 1495204 | 7/1989 | U.S.S.R. | 114/74 R |

Primary Examiner—Henry J. Recla
Assistant Examiner—Keith Kupferschmid
Attorney, Agent, or Firm—Michael E. Martin

[57] ABSTRACT

Marine tankers and cargo tanks for storing hydrocarbon liquids are provided with treated flue gas which is heated to a temperature at least about equal to or in excess of the liquids to be stored in the tanks to minimize the generation and emission of hydrocarbon vapors during loading, storage and transfer of hydrocarbon liquids with respect to the tanks.

4 Claims, 1 Drawing Sheet

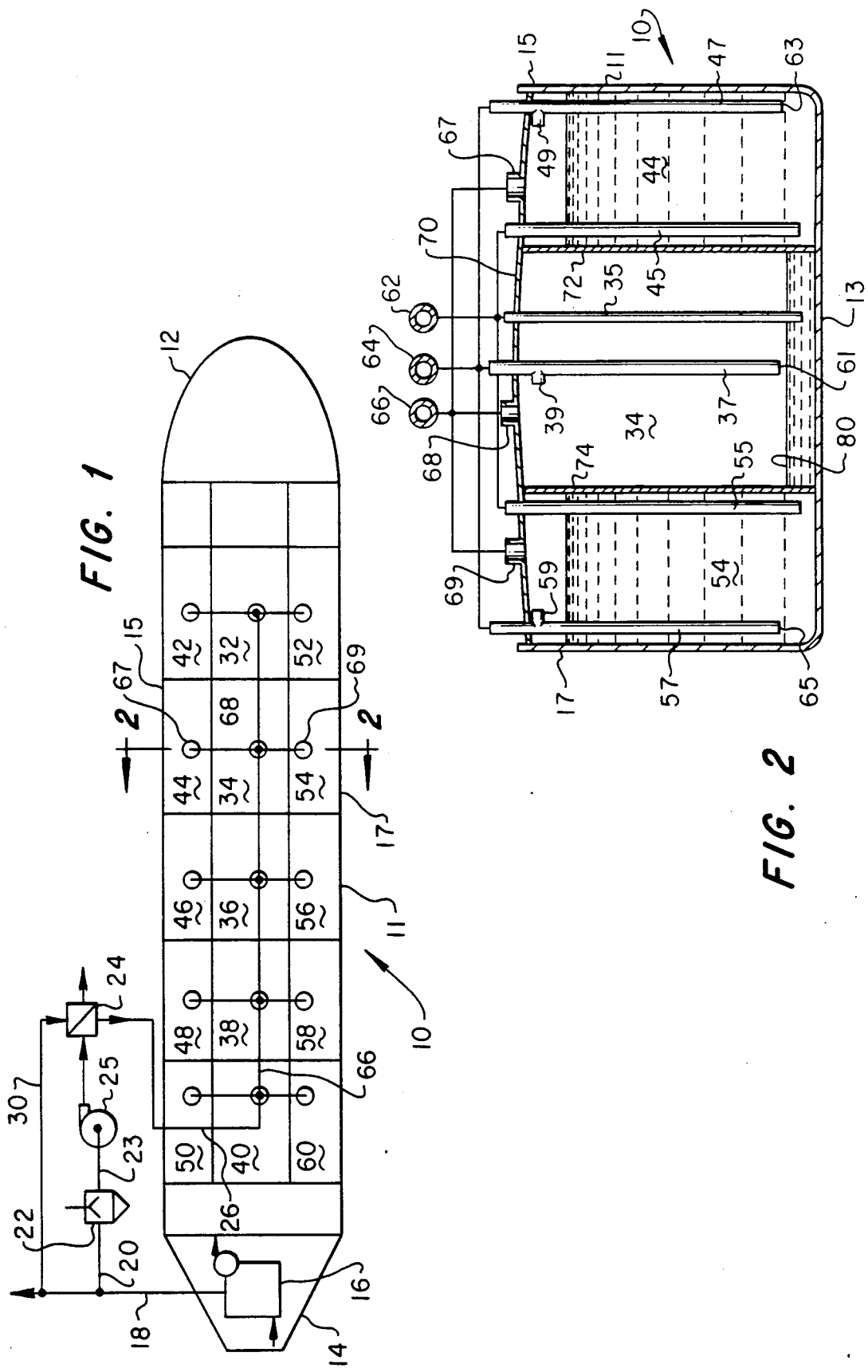

METHOD AND SYSTEM FOR REDUCING HYDROCARBON VAPOR EMISSIONS FROM TANKERS

BACKGROUND OF THE INVENTION

1. Field of the Invention

The present invention pertains to a method and system for reducing hydrocarbon vapor emissions from crude oil tankers and the like by treatment of an inert gas system for filling the tank spaces during transit and loading procedures.

2. Background

In conventional operations for loading crude oil and refined petroleum products tankers and the like, a considerable amount of hydrocarbon vapor may be generated during the loading process due to the temperature difference between the liquid entering the storage tanks and the ambient temperature of the vapor or inert gas occupying the tanks during the loading process. In many locations the temperature of the oil being loaded greatly exceeds the temperature of the gas or vapor in the tank at the time of loading. Considerable vapor generation occurs because the gas or vapor being emitted from the liquid oil near the oil-gas interface is heated and thus becomes less dense than the overlying gas. This buoyancy causes an interchange thereby lifting the evaporated hydrocarbon vapors higher into the vapor space and returning the inert gas to the vicinity of the oil-gas interface. This mechanism tends to reduce the partial pressure of hydrocarbon vapors near the oil-gas interface and thereby accelerates the rate of vapor diffusion away from the interface. Accordingly, further evaporation of hydrocarbons is accelerated. The present invention pertains to a method and system for reducing the amount of hydrocarbon vapor emissions when loading tankers with crude oil or other petroleum liquids having a temperature greater than the ambient temperature. The method and system may be applied to tankers as well as other storage facilities for storing crude oil and other petroleum liquids.

SUMMARY OF THE INVENTION

The present invention provides an improved method and system for reducing vapor emissions during the loading of tankers and other oil storage facilities with crude or refined hydrocarbon liquids.

In accordance with an important aspect of the present invention, crude oil tankers are provided with inert gas occupying the oil storage tank spaces which is at a temperature which matches or exceeds the temperature of the crude oil during the oil loading process. In this way, the evaporation of hydrocarbon components of the crude oil is minimized and the gas or vapor which is removed from the tank space is relatively free of hydrocarbon components.

In accordance with another aspect of the present invention, an improved inert gas system is provided for crude oil tankers and tankers adapted for transporting other hydrocarbon liquids wherein an inert gas source includes heat exchanger means for preheating the inert gas prior to injection into the tank spaces to maintain a gas temperature equal to or slightly in excess of the temperature of the liquid, such as crude oil, being loaded into or otherwise occupying the tanks. The method of the present invention further contemplates a tank loading sequence which maximizes the heat exchange between the outboard tanks in a conventional tanker and the inboard tanks to minimize the generation of hydrocarbon vapors.

Those skilled in the art will further appreciate the above-described features and advantages of the present invention together with other superior aspects thereof upon reading the detailed description which follows in conjunction with the drawing.

BRIEF DESCRIPTION OF THE DRAWING

FIG. 1 is a schematic plan view of a marine crude oil tanker illustrating certain features of an improved inert gas system in accordance with the present invention; and FIG. 2 is a vertical section view of the tanker illustrated in Figure showing a typical arrangement of the oil loading conduits, inert gas injection conduits and vapor collection conduits.

DESCRIPTION OF PREFERRED EMBODIMENTS

In the description which follows, like parts are marked throughout the specification and drawing with the same reference numerals, respectively. The drawing figures are basically in schematic form with conventional symbols illustrating certain components.

The plan view of FIG. 1 illustrates a marine crude oil tanker, generally designated by the numeral 10. The tanker 10 is a ship of conventional construction in respect that it has a bow 12, a stern 14 and may be propelled by a propulsion system which includes a steam driven turbine, not shown, mechanically or electrically linked to a propeller, not shown. Steam is furnished to the aforementioned turbine by a boiler 16 disposed in a conventional way in the stern portion of the tanker 10. Flue gas from the boiler 16 is conducted via a flue conduit 18 to the exterior of the ship through a conventional funnel, not shown. At least a portion of the flue gas is drawn off through a conduit 20 and processed through a water curtain type scrubber 22 utilizing sea water to rid the flue gas of particulate matter and condensables thereby leaving a flue gas to be conducted through a conduit 23 which comprises essentially inert gases such as nitrogen and carbon dioxide. The term "insert gas" as used herein shall mean a gas in which an insufficient amount of oxygen is present to support combustion in the presence of vapors from crude oil and other hydrocarbon liquids.

In accordance with an important aspect of the present invention, the flue gas is also conducted, by way of a gas pump 25, to and through a heat exchanger 24 before entering the inert gas distribution system. The heat exchanger 24 reheats the flue gas to a predetermined temperature in accordance with the present invention. The present invention contemplates that the inert gas may be heated to the prescribed temperature in one of several ways and the arrangement illustrated in FIG. 1 is merely exemplary. The heat exchange gas which reheats the gas flowing from the conduit 23 through the heat exchanger 24 to a distribution conduit 26 is additional flue gas which is drawn off from the conduit 18 through a conduit 30 and then, finally, after having heat extracted therefrom, discharged to atmosphere.

The tanker 10 is provided with a conventional arrangement of cargo storage tanks comprising center or inboard tanks 32, 34, 36, 38 and 40. Outboard on both sides of the center tanks are additional storage tanks 42, 44, 46, 48 and 50 on the port side and 52, 54, 56, 58 and 60 arranged along the starboard side. Other arrangements of tanks may, of course, enjoy the method and system of the present invention.

As shown by way of example in FIG. 2, the tanks 34, 44 and 54 are each provided with a crude oil loading conduit 35, 45 and 55, respectively, which are suitably connected to a crude oil loading manifold 62. Each of the tanks, including the tanks 34, 44 and 54, are provided with vapor purge conduits 37, 47 and 57. Vapor preferably enters the bottom of the respective conduits 37, 47 and 57 and flows therefrom to a collection manifold 64 wherein it may be vented to atmosphere through a riser, not shown, or subjected to further treatment. Each of the conduits 37, 47 and 57 has a secondary vapor inlet 39, 49 and 59 which receives vapor or gas from the respective tanks when the liquid level in the tanks covers the bottom inlet ends 61, 63 and 65, respectively. Inert gas is delivered to each of the tanks aforementioned, including the tanks 34, 44 and 54, from a central delivery conduit 66 which is connected to the conduit 26 through suitable branch conduits as indicated schematically in FIGS. 1 and 2. Inert gas is delivered to the respective tanks through small inlet domes, illustrated by way of example in FIG. 2 and designated by the numerals 67, 68 and 69, which may be formed as coamings in the deck 70 of the tanker 10. Looking further at FIG. 2, the tanker 10 is constructed in a rather conventional manner to have a hull 11 with a bottom 13 and outer topsides 15 and 17 with suitable longitudinal and transverse internal partitioning such as the longitudinal partitions 72 and 74 which separate the tank 34 from the tanks 44 and 54, respectively.

In conventional ship cargo tanks and similar storage tanks, the loading of a warm liquid such as crude oil, having a temperature significantly greater than the ambient temperature in the tank, results in relatively rapid evaporation of the lower density hydrocarbon compositions which cools a layer of liquid at the gas-liquid interface, such as the interface 80 in the tank 34, FIG. 2. This causes the liquid at the interface to become more dense and circulate toward the bottom of the tank thereby being replaced by a warmer less dense layer of liquid which, in turn, gives up its higher vapor pressure components to vaporization. The vapor moves into the tank space by two mechanisms, diffusion and convective flow. In certain oil transport operations, such as the transportation of crude oil from the ice free port of Valdez, Alaska to refineries on the west coast of the United States and other destinations, the crude oil at loading onto tankers is at a temperature in the range of about 100° F. to 105° F. This temperature is normally significantly greater than the ambient temperature in cargo tanks of tankers which have moved through ocean waters not exceeding 55° F. and water as well as ambient air temperatures sometimes much less. Accordingly, it is contemplated that, in order to minimize the generation of vapors of hydrocarbon compounds during loading of crude oil tankers and the like, particularly where significant differences in the temperature in the tank space and the temperature of the oil being loaded exists, the provision of a system which circulates or passes into the tanks inert gas at a temperature which exceeds the expected temperature of the oil to be loaded will significantly reduce the generation of such hydrocarbon vapors. Preferably, these spaces in the tanks of the tanker 10 are furnished with an inert gas prior to loading oil which would be heated to a temperature equal to or greater than that of the oil to be loaded.

Thus during oil loading the less dense, higher temperature inert gas would tend to float on top of any cooler, hydrocarbon-rich gas near the oil-gas interface which would reduce the convective mechanism of transport of inert gas back to the interface and evaporation would therefore also be suppressed. The system described hereinabove and illustrated in FIGS. 1 and 2 provides for such a method of minimizing the generation of hydrocarbon vapors.

Prior to and possibly during loading of crude oil into the tanks of the tanker 10, inert gas would be drawn off from the flue 18 by way of the scrubber 22, the gas pump 25 and the heat exchanger 24 to the distribution conduit 66 to circulate inert gas into the tank spaces at a temperature that equals or exceeds the expected temperature of the oil to be loaded. Prior to filling the tanks 44 and 54 as well as the tank 34, for example, inert gas would be circulated through the conduit 66 and the associated branch conduits to the inlet openings defined by the coamings 67, 68 and 69. Gas would be circulated into the tank spaces displacing gas or vapors in the tanks out through the purge conduits 37, 47 and 57. Preferably the outboard tanks such as the tanks 44 and 54 would be filled first with oil to warm the partitions 72 and 74, thereby minimizing the amount of inert gas which would be required to circulate through the larger tanks disposed inboard along the centerline of the tanker. In like manner, the fore and aft tanks could be filled before the amidships tanks so that the last to be filled tanks would have all four walls preheated. Vapor or cooled gas displaced from the tanks would be conducted by the conduit 64 to a vapor recovery system or vented as requirements dictate. The gas pump 25 would normally be operated at an output pressure to provide for a positive pressure in the tanks 34, 44 and 54, for example, which exceeds the ambient atmospheric pressure thereby assuring that oxygen-rich gasses are not introduced into the tank spaces.

Thanks to the provision of the system illustrated schematically in FIG. 1, the cooling of the inert flue gas, as provided by the scrubber 22, is overcome by reheating the gas in a heat exchanger 24 which may use a portion of the hot flue gas being discharged from the boiler 16. Those skilled in the art will recognize that other means may be provided for heating inert gas to be introduced into the respective cargo tanks. However, the utilization of waste heat from flue gasses in an arrangement such as illustrated in FIG. 1 is advantageous.

Suitable controls, not shown, may be provided for controlling the temperature of the inert gas discharged from the heat exchanger 24 to match or exceed the temperature of the oil being introduced into the cargo tanks in accordance with the present invention. The delivery of inert gas to the respective cargo tanks as well as the conduction of purge gas or vapor from the tanks and the distribution of oil into the tanks may be selectively controlled by suitable valving in the distribution piping network, which valving is not shown and is believed to be within the purview of the practitioner skilled in the art of tank ship plumbing design. Conventional elements and equipment may be utilized in conducting the method of the present invention. The schematic diagram of Figure is for illustrative purposes only. The scrubber 22, gas pump 25 and heat exchanger 24 may, of course, all be mounted within a suitable machinery space on board the tanker 10.

Although a preferred embodiment of an improved method and system for minimizing the emission of hydrocarbon vapors from tank ships and the like has been described in detail herein, those skilled in the art will further appreciate that various substitutions and modifications may be made to the method and system without departing from the scope and spirit of the invention which is set forth in the appended claims.

What is claimed is:

1. A method for minimizing the generation and emission of hydrocarbon vapors from the cargo tanks of a tank ship during loading of liquid cargo, said tank ship including an arrangement of plural cargo tanks including at least one inboard tank and opposed outboard tanks, said method comprising the steps of:

providing a supply of substantially inert gas for introduction into said cargo tanks;

introducing said inert gas into said cargo tanks prior to the filling and above a liquid-gas interface during the filling of said tanks at a temperature which is at least about equal to or above the temperature of liquid cargo being loaded into said cargo tanks; and filling said outboard tanks with said inert gas and liquid cargo prior to filling said inboard tank with said liquid cargo to aid in heating said inboard tank prior to filling said inboard tank with said liquid cargo.

2. The method set forth in claim 1 wherein:

said plural tanks are arranged fore and aft and fore and aft tanks are filled with liquid prior to filling amidships tanks to preheat partitions which define said amidships tanks.

3. A method for minimizing the generation and emission of hydrocarbon vapors from a cargo tank of a tank ship during loading of liquid cargo, said tank ship including a boiler which produces flue gas containing substantial quantities of carbon dioxide and nitrogen, said method comprising the steps of:

providing a supply of said flue gas as an inert gas by extracting at least part of said flue gas and passing said part of said flue gas through a heat exchanger to provide said part of said flue gas at a temperature which is at least about equal to or in excess of the temperature of said liquid cargo prior to loading and during loading of said liquid cargo into said cargo tank; and introducing said part of said flue gas into said cargo tank prior to the filling and above a liquid-gas interface during the filling of said tanks, which interface is formed upon introduction of said liquid into said cargo tank, and at a temperature which is at least about equal to or above the temperature of said liquid cargo while being loaded into said cargo tank to minimize the generation and emission of said vapors.

4. The method set forth in claim 3, including the step of:

extracting a further part of said flue gas and passing said further part of said flue gas through said heat exchanger means to undergo heat exchange with said part of said flue gas which is to be provided at said temperature which is at least about equal to or in excess of the temperature of said liquid cargo.

* * * * *